United States Patent [19]

Tóth

[11] 3,998,996
[45] Dec. 21, 1976

[54] PROCESS FOR THE MANUFACTURE OF A MIXED CATALYST

[75] Inventor: Tibòr Toth, Frankfurt am Main, Germany

[73] Assignee: Hoechst Aktiengesellschaft, Frankfurt am Main, Germany

[22] Filed: Mar. 19, 1975

[21] Appl. No.: 559,713

[30] Foreign Application Priority Data

Mar. 21, 1974 Germany .......................... 2413513
Apr. 9, 1974 Germany .......................... 2417150

[52] U.S. Cl. .......................... 526/114; 252/429 C; 526/97; 526/115; 526/121; 526/124; 526/128; 526/129; 526/155; 526/156; 526/350; 526/352

[51] Int. Cl.² ...................... C08F 4/02; C08F 10/02

[58] Field of Search .............. 252/429 C; 260/93.7, 260/94.9 DA, 94.9 E; 526/114, 115, 121, 124, 128

[56] References Cited

FOREIGN PATENTS OR APPLICATIONS 2,000,566  11/1970  Germany
1,264,416  2/1972  United Kingdom Primary Examiner—Edward J. Smith
Attorney, Agent, or Firm—Curtis, Morris & Safford

[57] ABSTRACT

A mixed catalyst for the low pressure polymerization of 1-olefines is prepared by reacting a chromium-III compound containing water of crystallization with a metal alcoholate and by mixing the obtained chromium complex with an activator. The catalyst excels by allowing a simple preparation method and by a very good activity.

13 Claims, No Drawings

PROCESS FOR THE MANUFACTURE OF A MIXED CATALYST

For polymerizing 1-olefines and their mixtures according to the Ziegler low-pressure process there are used as catalysts compounds of elements which belong to the $IV^{th}$ to $VI^{th}$ subgroup of the periodic system, combined with organometallic compounds of elements which belong to the $I^{st}$ to $III^{rd}$ main group of the periodic system.

A process for polymerizing 1-olefines was disclosed, whereby the reaction product of a tetravalent halogen-containing titanium compound having the general formula $TiX_n$ $TiX_n(OR)_{n-m}$ with magnesium alchoholates is used as catalyst (cf. German "Offenlegungsschrift" No. 1,795,197).

For another polymerization process there is used for the polymerization the reaction product of a tetravalent halogen-containing titanium compound with a complex metal alcoholate (cf. German Patent No. 1,957,679).

A further process is known which also provides for the use of derivatives of halogen of a transition metal, preferably chlorides, bromides, iodides, oxyhalides and halogenoalkoxides of titanium and vanadium combined with a compound having the formula $X_{m-n}M(OR)_n$ and with an organometallic compound as reducing agent for polymerizing olefines. The activated solid is prepared by having react alkoxy compounds with the halogen compound of a transition metal with the exclusion of humidity, preferably at a temperature above room temperature. The operation is carried out either in the absence of a solvent in a pure halogen compound, if this latter is liquid under the reaction conditions, or in a solution in a solvent which is inert to the substances being used for the reaction, e.g. in a saturated hydrocarbon (cf. German "Offenlegungsschrift" No. 2,000,566).

Though catalysts based on metal alcholates and transition metal halide excel by a very intense polymerization activity, the catalysts hitherto known have the disadvantage that their preparation sets free large quantities of washing liquids which consist of organic solvents, metal compounds dissolved therein and of other reaction products. To recycle these washing liquids is complicated and expensive.

This disadvantage can be reduced or avoided at all, if metal alchololates are reacted with chromium-III compounds containing water of crystallization.

Thus, the invention relates to a process for the manufacture of a mixed catalyst by reacting a transition metal compound with a metal alcoholate and by mixing the reaction product (component A) with an activator (component B), which comprises blending a chromium-III compound containing water of crystallization with a metal alchololate at a molar proportion of chromium to metal in the range of 1 : 1 to 1 : 10 for the purpose of preparing component A and, optionally, fixing the chromium complex obtained onto a carrier material, whereby from 0.5 to 5 g of carrier material are used for each 1 mMole of chromium.

The invention further relates to the catalyst obtained by the abovementioned process and to its use for the polymerization of 1-olefines.

Chromium-III compounds containing water of crystallization are essentially considered those containing a high ratio of chromium. There have to be mentioned in the first place halides, sulfates and low-molecular carboxylates, such as e.g. $CrF_3.aq$, $CrCl_3.aq$, $Cr_2(SO_4)_3.aq$, $[Cr(H_2O)_6](CH_3CO_2)_3$, $[Cr(H_2O)_6](HCO_2)_3$.

Especially preferred are compounds having the formula $CrX_3.nH_2O$, wherein $n$ means a number from 1 to 10 and X is = Cl or Br.

Such a chromium compound is e.g. $CrCl_3.6 H_2O$ which may be present in three modifications: $[Cr(H_2O)_6]Cl_3$, $[CrCl(H_2O)_5] Cl_2.H_2O$ and $[CrCl_2(H_2O)_4]Cl.2 H_2O$.

Further chromium-III chlorides containing water of crystallization and being suitable for the manufacture of the catalyst are $[CrCl_3(H_2O)_3]$, $[CrCl_2(H_2O)_4]Cl$, $CrCl_3.10 H_2O$. Lit.: G. Brauer "Handbuch der Präparativen Anorganischen Chemie II", page 1168 to 1223).

Suitable metal alcoholates are those having the formula

wherein $Me^1$, $Me^2$, $Me^3$ each means a metal of the $I^{st}$, $II^{nd}$, $III^{rd}$ or $IV^{th}$ main group or of the $I^{st}$, $II^{nd}$, $IV^{th}$ and $V^{th}$ subgroup of the periodic system of elements or iron, cobalt or nickel, preferably, Li, Na, K, Mg, Ca, Al, Si, Ti, Zr; R represents a hydrocarbon radical having from 1 to 20 carbon atoms, preferably from 1 to 6 carbon atoms, especially an alkyl radical having from 1 to 6 carbon atoms, $x$ means an integer from 1 to 5,
$y$ means an integer from 0 to 2,
$z$ means an integer from 0 to 2,
$v$ means an integer from 2 to 8 and
$w$ means either 0 or 1, provided that (valency $Me^1$) . $x$ + (valency $Me^2$) . $y$ + (valency $Me^3$) .$z+w = v$.

The simple metal alchololates ($w$, $y$ and $z$ in the above-mentioned formula = 0) are prepared according to known methods. Thus it is possible, for example, to react the metal with the absolute alcohol or to have react an alcoholate of a lower alcohol with a higher alcohol or to carry out a double reaction of an alkali alcoholate with an anhydrous metal halide.

Preferred simple metal alcoholates are the alcoholates of magnesium, e.g. $Mg(OC_2H_5)_2$, $Mg(OiC_3H_7)_2$, $Mg(OiC_4H_9)_2$, Mg-phenolate.

The complex metal alcoholates (alkoxo salts) are also prepared according to known methods (literature: Meerwein Ann. 455 (1927) page 227, 476 (1929) page 113; Houben-Weyl, "Methoden der organischen Chemie", vol. 6/2, page 30).

The following examples shall be cited for the manufacture of complex metal alcoholates:

1. Two metal alcoholates are allowed to interreact with each other, for example

in a suitable solvent.

2. Dissolution of a metal alcoholate in an alcoholic solution of a metal alcoholate

3. Dissolving simultaneously two metals in alcohol

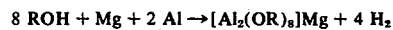

4. Neutralization of the alkoxoacids on which the complex metal alcoholates are based, in alcoholic solution with a metal alcoholate having alkaline reactions; for example

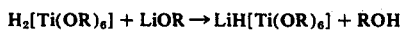

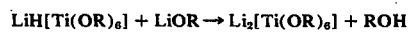

5. Double reaction of alkali metal salts of alkoxoacids with anhydrous metal chlorides

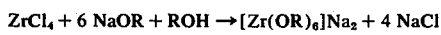

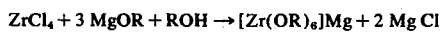

The following metal alcoholates can be used, for example, for preparing the complex metal alcoholates:

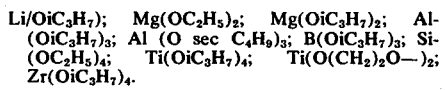

The following specification represents examples of metal alcoholates

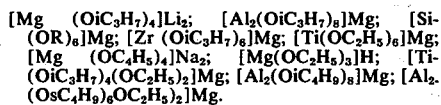

Especially preferred complex metal alcoholates are those which contain magnesium and/or aluminum and-/or titanium and/or silicon.

Upon reaction of the chromium-III compound which contains water of crystallization with the metal alcoholate a chromium complex which is soluble in most of the organic solvents and which represents a particularly active catalyst for the polymerization of 1-olefines is formed.

If the reaction of complex metal alcoholates is carried out with chromium-III compounds containing water of crystallization, the isolation of the complex metal alcoholates can be dispensed with. For preparing the complex metal alcoholates there may be used another ratio of alcoholates than the one found by calculation. In that case a simple metal alcoholate is present in excess, a fact that may sometimes be an advantage. This excess can also be produced by addition of a simple metal alcoholate to the complex metal alcoholate.

For reacting the metal alcoholate with the chromium compound containing water of crystallization, a temperature of from 0° to 250° C is recommended, preferably a reaction temperature of from 32° to 150° C.

The reaction lasts — depending on the solvent and the temperature — from 30 minutes to 20 hours. A longer reaction period does not result in any essential improvement of the catalytic properties.

It is useful to carry out the reaction in a chlorine-containing hydrocarbon, such as CCl₄, CHCl₃, CH₂Cl₂ or in an aromatic hydrocarbon such as benzene, xylene, or in hydrogenated Diesel oil fractions or in aliphatic and cycloaliphatic hydrocarbons.

A further advantage of the process is the fact that the reaction can also be carried out in alcohols such as ethanol, propanol, i-propanol, i-butanol or in mixtures of hydrocarbons and alcohols.

The quantity of the solvent used for the reaction depends on how efficiently the solvent dissolves the chromium complex. It is also possible to carry out the reaction in the absence of a solvent.

The solvent is separated from the catalyst by distillation or by washing with hydrocarbons, if it interferes with the polymerization.

The molar ratio of chromium to the metal component in the metal alcoholate ranges from 1 : 1 to 1 : 10 in the catalyst component A, preferably from 1 : 3 to 1 : 6.

The soluble chromium complex may be fixed onto a carrier material. Suitable carrier materials are those having a specific surface of from 200 to 500 m²/g. As examples can be cited inorganic oxides such as MgO, Al₂O₃, TiO₂, sulfates such as BaSO₄, CaSO₄, silicates such as silicate-containing substances such as bentonite, pumice, diatomaceous earth, kaolin, aluminum silicate, talc, phosphates such as Ca₃(PO₄)₂, apatite, hydroxides such as Mg(OH)₂, and carbonates such as BaCO₃, CaCO₃ as well as charcoal and SiO₂.

Especially suitable are SiO₂, Al₂O₃, MgO, Mg(OH)₂ and their mixtures. The carrier material is dried before use by submitting it to a heating operation so that the water absorbed at the surface is essentially eliminated. Provided that the carrier material is sufficiently heat resistant so as to avoid disintegration at the chosen temperature e.g. by separation of hydroxyl groups or by sintering a heat treatment in possible at a temperature within the range of from 150° to 1000° C.

For preparing the catalyst component A there is used a quantity of from 0.5 to 5 g, preferably of from 2 to 3.5 g of carrier material per mMole of chromium. The chromium complex is fixed onto the carrier material in such a way that the carrier material is introduced into the solution of the chromium complex while stirring, the chromium complex is then precipitated. While stirring a solvent is preferably added to the suspension in which the chromium complex is insoluble. Optionally, the solvent which had been used for preparing the complex is eliminated by distillation. However, it is also possible to evaporate to dryness the suspension containing the chromium complex and the carrier material. After the fixing reaction the solid is submitted to a heat treatment. The solid matter is heated — optionally while stirring — for a period from 10 minutes to 10 hours, preferably from 20 minutes to 5 hours, to a temperature comprised between 60° and 800° C, preferably between 80° and 400° C, especially between 100° to 200° C, a disintegration of the carrier material as mentioned in respect to the drying operation must be avoided, however. If the solid matter in suspension is submitted to a heat treatment, the boiling point of the dispersing agent sets the limit for the miximum treatment temperature.

The transition of the chromium compound of the catalyst component A into the polymerization-active valence stage is most usefully carried out during the polymerization by means of an organometallic component (component B) at a temperature of from 20° to 200° C, preferably from 50° to 150° C.

Component A can also be heat-treated prior to polymerization with the organometallic compound at a temperature of from −30° to +150° C, preferably from 0° to 40° C and then introduced into the polymerization process. If chlorine-containing organometallic compounds are used, it is useful in that case to wash the reaction product obtained. Subsequently, activation is carried out by means of an organometallic compound at a temperature of from 20° to 200° C, preferably from 50° to 150° C.

Organometallic compounds having formula $Me^4 R'_q X_{p-q}$ are used as component B, wherein $Me^4$ represents a metal of the $I^{st}$, $II^{nd}$, $III^{rd}$ or $IV^{th}$ main group or of the $II^{nd}$ subgroup of the periodic system, preferably aluminum and zinc, especially aluminum; R' represents a hydrocarbon radical having from 1 to 16 carbon atoms, preferably an alkyl radical having from 1 to 16 carbon atoms, especially an alkyl radical having from 2 to 12 carbon atoms, X represents hydrogen, a halogen atom or alkoxy or dialkylamine radicals having from 1 to 8 carbon atoms, p represents the valency of $Me^4$ and q represents an integer corresponding to $1 \leq q \leq p$.

Chlorine-containing organoaluminum compounds such as dialkylaluminum-monochlorides having formula $R'_2AlCl$ or alkylaluminum-sesquichlorides having formula $R'_3Al_2Cl_3$ wherein R' has the aforementioned meaning are especially well suitable. The following examples may be cited:

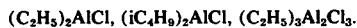
$(C_2H_5)_2AlCl$, $(iC_4H_9)_2AlCl$, $(C_2H_5)_3Al_2Cl_3$.

Aluminum trialkyls $AlR'_3$ or aluminum dialkylhydrides having formula $AlR'_2H$, wherein R' has the aforementioned meaning, preferably $Al(C_2H_5)_3$, $Al(C_2H_5)_2H$, $Al(C_3H_7)_3$, $Al(C_3H_7)_2H$, $Al(iC_4H_9)_3$, Ai-$(iC_4H_9)_2H$ are used with equal advantage as component B.

Furthermore, the reaction products of aluminum trialkyls or aluminum dialkyl-hydrides the hydrocarbon radicals of which having from 1 to 16 carbons atoms, preferably $Al(iBu)_3$ or $Al(iBu)_2H$, with diolefins containing from 4 to 20 carbon atoms, preferably isoprene, are used as organoaluminum compounds, as example may be cited aluminum-isoprenyle.

The organometallic component is used at a concentration ratio of from 0.5 to 10 mMole, preferably from 2 to 8 mMole per liter of dispersing agent or per liter of reactor volume.

The polymerization is carried out either in solution, in suspension or in the gaseous phase continuously or discontinuously.

In the case of polymerization in suspension or in the gaseous phase, the operation is performed at a temperature of from 20° to 125° C, preferably from 50° to 90° C and under a pressure of from 1 to 50 kg/cm², preferably from 1.5 to 10 kg/cm².

A quantity of from 0.005 to 1 mMole, preferably from 0.05 to 0.5 mMole of chromium such as it occurs as component A of the catalyst is used per liter of dispersing agent or per liter of reactor volume upon polymerization in suspension or in the gaseous phase.

The polymerization in solution is carried out preferably for preparing low-molecular polyolefines (polyolefine-waxes) having RSV values of from 0.1 to 0.6 dl/g (measured as solution at 1% in decahydronaphthalene at 135° C) at a temperature of from 120° to 200° C and under a pressure of from 1 kg/cm² to 50 kg/cm², preferably from 1.5 to 20 kg/cm². The component A of the catalyst is used for the polymerization in solution at a concentration ratio of from 0.05 to 2 mMole of Cr per liter of solvent.

Suitable solvents for a polymerization in solution or in suspension are the inert solvents frequently used for the lowpressure process according to Ziegler, such as aliphatic or cycloaliphatic hydro-carbons, namely e.g. pentane, hexane, heptane, cyclohexane, methylcyclohexane. Furthermore it is possible to use aromatic hydrocarbons such as benzene, xylene, or gasoline or hydrogenated Diesel oil fractions which have been treated carefully to eliminate oxygen, sulfur compounds and humidity.

Polymerization of 1-olefines having the formula $R''-CH=CH_2$ is carried out by means of the catalysts according to the invention, wherein R'' means hydrogen or a straight-chain or branched alkyl radical having from 1 to 10, preferably from 1 to 8 carbon atoms, e.g. ethylene, propylene, butene-(1), pentene-(1), 4-methyl-pentene-(1), octene-(1). Preference is given to the polymerization of ethylene solely or as a mixture of a least 70 weight % of ethylene and a maximum of 30 weight % of another 1-olefine of the abovementioned formula. Polymerization is preferably carried out with a mixture of at least 95 weight % of ethylene and of a maximum of 5 weight % of another 1-olefine of the abovementioned formula. The molecular weight of the polymers is controlled in known manner, preferably by means of hydrogen.

For technological purposes polymerizations according to the Ziegler process are especially interesting, if the yields obtained at a pressure of less than 10 kg/cm² are already so high that the polymers can be processed further without eliminating the catalyst. However, the remaining catalyst portions may not cause any discolorations of the polymers nor may the processing machines be subject to corrosion. Further catalysts of special interest are those the polymerization of which yields a polymer having a special structure so that e.g. the polymer can be worked up to low-distortion injection molded articles.

Due to the high activity of the catalysts according to the invention, very high catalyst yields are obtained already under a pressure of from 2 to 8 kg/cm² upon polymerization in suspension, in solution or in the gaseous phase.

The polyolefines which are interesting for the extrusion or injection molding, processes and which have RSV values of from 0.8 to 6 dl/g (measured in a decahydronaphthalene solution at 0.1% at a temperature of 135° C) are produced — by means of the catalysts according to the invention — at such high yield rates that the totality of the catalyst may remain in the polymer.

Thus, the yield of 2.5 kg of polyethylene per mMole of chromium is obtained e.g. when using a catalyst which is prepared of $CrCl_3.6 H_2O$ with $Mg(OC_2H_5)_2$ containing water of crystallization, under a polymerization pressure of 7 kg/cm².

The polyethylenes prepared by means of the catalysts according to the invention show $i_{15}/i_5$ — values of from 4 to 5.3, therefore they are especially convenient for processing injection molded articles, the shaped articles which are obtained have a very low tendency to distortion and show excellent coloration.

$i_{15}/i_5$ is described in, B. J. Cottam, J.Appl.Polym.Sci.9 (1965), pg.1853.

An increased polymerization pressure enables a polymerization with an even smaller quantity of catalyst, since the catalyst yield increases with the polymerization pressure increasing.

Therefore, the catalysts according to the invention provide for carrying out very simple polymerization processes, since the polymerizations run under very low pressure so that costly and complicated operations such as disintegration and elimination of the catalyst etc. are not necessary.

The polymerization in suspension provides for the polyolefine to be isolated from the dispersing agent by filtration, to be dried and submitted to direct further processing.

The extremely small quantities of catalyst remaining in the polymer do neither cause any discolorations of the polymer nor any corrosion damage to the processing machines.

A further advantage of the process is that the preparation of the catalyst does not yield any by-products which would have to be eliminated by filtration or decantation. The entire chromium compound used for the preparation of the catalyst contributes to the polymerization as a very active catalyst. Due to this fact there can be dispensed with the elimination of any by-products which are forming upon preparation of other catalysts. Thus the often expensive and complicated preparation of anhydrous compounds is not necessary, due to the possibility to start from hydrous chromium compounds as initial products for the preparation of the catalysts.

The following examples illustrate the invention:

EXPERIMENTAL EXAMPLES

EXAMPLES 1

26.6 g (0.1 mole) of $CrCl_3.6\ H_2O$ are added to a suspension of 68.4 g (0.6 mole) of $Mg(OC_2H_5)_5$ in 300 ml of chloroform and stirred under reflux for 8 hours. 500 ml of Diesel fuel (boiling range from 140° to 200° C) are added dropwise to the solution, while simultaneously eliminating by distillation the chloroform and the alcohol which is formed during the reaction. Upon elimination of the chloroform, the Mg-Cr-compound is precipitated. Subsequently, the suspension is stirred at 140° C for 2 hours. The volume of the suspension is filled up with Diesel fuel to reach 1 liter, containing 0.1 mole of Cr per liter.

500 ml of Diesel oil are introduced first into a 1 liter autoclave made of glass. After heating to 80° C and evacuation of the air by means of ethylene 4 mMole of $Al(C_2H_5)_2Cl$ and 2 ml (0.2 mMole Cr) of the aforementioned suspension were added.

The polymerization was carried out at 85° C by introducing under a pressure of 2 kg/cm² hydrogen and subsequently ethylene up to a total pressure of 6 kg/cm². The total pressure of 6 kg/cm² was maintained by continuing to introduce ethylene under pressure. The polymerization is terminated after 2 hours.

224 g of polyethylene having a RSV value of 2.7 dl/g (measured on a solution at 0.1% in decahydronaphthalene at 135° C) were obtained after filtration.

1.1 kg of polyethylene were obtained per mMole of chromium.

COMPARATIVE EXAMPLE A (Preparation of component A with anhydrous $CrCl_3$.)

15.8 g (0.1 mole) of anhydrous $CrCl_3$ were added to a suspension of 68.4 g (0.6 mole) of $Mg(OC_2H_5)_2$ in 300 ml of chloroform and stirred under reflux for 8 hours. No reaction was discernable between $CrCl_3$ and $Mg(OC_2H_5)_2$. The reaction mixture was worked-up as per example 1 and used for polymerization.

500 ml of Diesel oil were introduced first into an autoclave made of glass. After heating to 80° C and evacuation of the air by means of ethylene there were added 5 mMole of $Al(C_2H_5)_2Cl$ and 5 ml (0.5 mMole Cr) of the abovementioned suspension. The addition of ethylene was controlled in such a way that a pressure of 8 kg/cm² was reached as maximum. Approximately 12 g of polyethylene were obtained after 6 hours.

The result per mMole of chromium was about 24 g of polyethylene obtained.

EXAMPLE 2

200 ml of Diesel oil and 68.4 g (0.6 mole) of $Mg(OC_2H_5)_2$ were added to a solution of 26.6 g. (0.1 mole) of $CrCl_3.6\ H_2O$ in 100 ml of ethanol and boiled under reflux for 8 hours while stirring. 500 ml of Diesel oil were added dropwise, while eliminating the alcohol simultaneously by distillation. The reaction product was tempered at 140° C in suspension for one hour. The suspension was augmented with Diesel oil to attain one liter.

500 ml of Diesel oil and 0.4 ml of $CHCl_3$ were introduced first into an autoclave made of glass. After heating to 80° C and evacuation of the air by means of ethylene, there were added 3mMole of $Al(C_2H_5)_3$ and 1 ml (0.1 mole Cr) of the abovementioned suspension.

The polymerization was carried out at 85° C introducing 40 g of ethylene/h and hydrogen at such a rate that the hydrogen contained in the gaseous phase was 25% by volume.

The polymerization is terminated at a pressure of 6.5 kg/cm² after 4 hours.

160 g of polyethylene having a RSV value of 2.6 dl/g were obtained after filtration.

The result per mMole of Cr was 1.6 kg of polyethylene obtained.

EXAMPLE 3

The polymerization was carried out according to example 2 while using 1 mMole of $Al(C_2H_5)_3$ and of 1 ml (0.1 mMole Cr) of the suspension prepared as per example 2. The polymerization was carried through at 80° C by introducing 40 g of ethylene, 1.2 g of butene-(1) and hydrogen at such a rate that the hydrogen portion contained in the gaseous phase was 20% by volume.

During the polymerization the pressure increased to about 6.5 kg/cm². After having separated the dispersing agent, the product was dried. 168 g of ethylene-butene-copolymer having a RSV value of 2.8 dl/g and a density of 0.936 g/cm³ were obtained.

EXAMPLE 4

68.4 g (0.6 mole) of $Mg(OC_2H_5)_2$ were added to a suspension of 26.6 g (0.1 mole) of $CrCl_3.6\ H_2O$ in 300 ml of chloroform and stirred under reflux for 16 hours. 500 ml of Diesel oil were added dropwise to the solution and the chloroform eliminated by distillation.

The suspension was augmented with Diesel oil to reach 1 liter.

The polymerization was carried out according to example 1 while using 0.46 g (4 mMole) of $Al(C_2H_5)_3$ and 1 ml (0.1 mMole Cr) of the abovementioned suspension.

The hydrogen portion contained in the gaseous phase was 35% by volume. The pressure increased during the polymerization to 7 kg/cm². 130 g of polyethylene having a RSV value of 2.1 dl/g were obtained.

The yield per mMole of chromium was 1.3 kg of polyethylene.

EXAMPLE 5

50 ml (5 mMole) of suspension of the catalyst component A prepared according to example 4 were purified of Diesel oil by washing with hexane in a 100 ml flask, then pre-activated in 50 ml of hexane with 15 mMole of $Al(C_2H_5)_2Cl$ at 30° C.

2.5 ml (0.25 mMole Cr) of the suspension of the preactivated component A were blended under nitrogen with 50 g of polyethylene (RSV value = 2.0 dl/g) while stirring vigourously in a 1 liter laboratory autoclave equipped with a stirring device scraping along the wall, hexane was then evacuated from the autoclave by flushing with nitrogen. Polymerization was performed after having added 5 mMole of $Al(C_2H_5)_2Cl$ and introducing 30 g of ethylene/h at 95° C. The portion of hydrogen for the control of the molecular weight was 30% by volume.

180 g of polyethylene having a RSV value of 2.7 dl/g were obtained after 6 hours. The final pressure in the autoclave was 6.6 kg/cm².

720 g of polyethylene were obtained per mMole of chromium.

EXAMPLE 6

500 ml of Diesel oil (boiling range from 140° to 200° C) were introduced first into a 1 liter-autoclave and heated to 125° C. The air was evacuated by means of nitrogen. 5 ml (1.0 mMole Cr) of the suspension of the pre-activated component A according to example 5 and 8 mMole of $Al(C_2H_5)_2Cl$ were added. The polymerization was carried out at temperatures of from 130° to 140° C by introduction of 50 g of ethylene/h. The portion of hydrogen for the control of the molecular weight was 60% by volume. The polymerization was cut off after about 3 hours at a pressure increase in the reactor to 7 kg/cm².

25 ml of i-propanol were added to the hot polymer solution and stirred for 30 minutes. After cooling the product was filtered off and dried in vacuo at 70° C.

152 g of polyethylene having a RSV value of 0.52 dl/g were obtained.

EXAMPLE 7

34.2 g (0.3 mole) of $Mg(OC_2H_5)_2$ were added to a suspension of 21.2 g (0.1 mole) of $Cr[Cl_3(OH_2)_3]$ in 300 ml of chloroform and stirred under reflux for 8 hours. 500 ml of Diesel oil were added dropwise to the solution and the chloroform eliminated by distillation.

The suspension was augmented with Diesel oil to reach 1 liter.

The test was carried out according to example 1 while using 3.5 mMole of $Al(C_2H_5)_2Cl$ and 1 ml (0.1 mMole Cr) of the abovementioned suspension.

The portion of hydrogen contained in the gaseous phase was 40% by volume. The pressure increased during the polymerization to 6.1 kg/cm². 144 g of polyethylene having a RSV value of 2.0 dl/g were obtained.

The result per mMole of chromium was 1.44 kg of polyethylene obtained.

EXAMPLE 8

23.0 g (0.1 mole) of $Cr[Cl_2(OH_2)_4]Cl$ were added to a suspension of 49.3 g (0.44 mole) of $Mg(OC_2H_5)_2$ in 300 ml of $CCl_4$ and stirred under reflux for 12 hours. 500 ml of Diesel oil were added dropwise to the solution, while simultaneously eliminating $CCl_4$ by distillation.

The suspension was augmented with Diesel oil to reach 1 liter.

The polymerization was carried out according to example 1 while using 4 mMole of aluminumethyl-sesquichloride and 1 ml (0.1 mMole Cr) of the abovementioned suspension. The hydrogen portion contained in the gaseous phase was 35% by volume. The pressure increased during the polymerization to 6.2 kg/cm². 114 g of polyethylene having a RSV value of 2.4 dl/g were obtained.

The result per mMole of chromium was 1.14 kg of polyethylene obtained.

EXAMPLE 9

26.6 g (0.1 mole) of $CrCl_3.6 H_2O$ were added to a suspension of 45.6 g (0.4 mole) of $Mg(OC_2H_5)_2$ in 300 ml of chloroform and stirred under reflux for 10 hours. 500 ml of Diesel oil were added dropwise to the solution and simultaneously the chloroform and the alcohol formed during the reaction elminated by distillation. The precipitated chromium-magnesium-compound was subsequently tempered in suspension at a temperature of from 140° to 145° C for 3 hours. The suspension was augmented with Diesel oil to reach 1 liter.

The polymerization was carried out according to example 3 while using 4 mMole of aluminum triisobutyl, 1 ml (0.1 mMole Cr) of the abovementioned suspension and 5 ml of chloroform. The hydrogen portion contained in the gaseous phase was 30% by volume.

The pressure increased to 6.8 kg/cm² during the polymerization. Polyethylene was filtered from the dispersing agent after 4 hours, then dried.

166 g of polyethylene having a RSV value of 2.55 dl/g were obtained.

EXAMPLE 10

20.4 g (0.1 mole) of $Al(OiC_3H_7)_3$ were added to a suspension of 45.6 g (0.4 mole) of $Mg(OC_2H_5)_2$ in 300 ml of chloroform and boiled under reflux for 3 hours. The suspension was then blended with 26.6 g (0.1 mole) of $CrCl_3.6 H_2O$ and stirred under reflux for 10 hours.

500 ml of Diesel oil (boiling range from 140° to 200° C) were added dropwise to the solution, while eliminating simultaneously by distillation the chloroform and the alcohol formed during the reaction. The chromium complex precipitated upon elimination of the chloroform. The temperature was maintained for further 2 hours at 140° C. The suspension was augmented with Diesel oil to reach 1 liter. The suspension contained 0.1 mole of Cr per liter.

500 ml of Diesel oil were introduced first into a 1 liter-autoclave made of glass. After heating to 80° C and evacuation of the air by means of ethylene there were added 4 mMole of $Al(C_2H_5)_2Cl$ and 2 ml (0.2 mMole Cr) of the abovementioned suspension.

Polymerization was carried out at 85° C by introducing under a pressure of 2 kg/cm² hydrogen and, subsequently, ethylene up to a total pressure of 6 kg/cm². The pressure of 6 kg/cm² was maintained by continuing to introduce ethylene under pressure. Polymerization was terminated after 2 hours. 170 g of polyethylene having a RSV value of 2.5 dl/g were obtained after filtration. The result obtained pro mMole of chromium was 850 g of polyethylene.

COMPARATIVE EXAMPLE B

Preparation of component A by means of anhydrous $CrCl_3$.

15.8 g (0.1 mole) of anhydrous $CrCl_3$ were added to a suspension of 45.6 h (0.4 mole) of $Mg(OC_2H_5)_2$ and 20.4 g (0.1 mole) of $Al(OiC_3H_7)_3$ in 300 ml of chloroform and stirred under reflux for 10 hours.

No reaction was discernable between $CrCl_3$ and the complex metal alcoholate. The suspension was worked up as per the description given by example 10, then used for polymerization.

500 ml of Diesel oil were introduced first into an autoclave made of glass. After heating to 80° C and evacuation of the air by means of ethylene 5 mMole of $Al(C_2H_5)_2Cl$ and 5 ml (0.5 mMole Cr) of the abovementioned suspension were added. The introduction of ethylene was conrolled in such a way that a maximum pressure of 8 kg/cm² was not surpassed. About 12 g of polyethylene were obtained after 6 hours.

The result per mMole of chromium was about 27 g of polyethylene obtained.

EXAMPLE 11

21.8 g (0.1 mole) of $Ti(OiC_3H_7)_4$ were added dropwise to a suspension of 45.6 g (0.4 mole) of $Mg(OC_2H_5)_2$ in 200 ml of carbon tetrachloride and stirred under reflux for 6 hours. 26.6 g (0.1 mole) of $CrCl_3.6\ H_2O$ were added subsequently and stirring of the reaction mixture under reflux continued for further 8 hours. 500 ml of Diesel oil were added dropwise to the solution and $CCl_4$ and alcohol eliminated simultaneously by distillation. The reaction product was tempered at 140° C in suspension for 1 hour. The suspension was augmented with Diesel oil to reach 1 liter.

500 ml of Diesel oil were introduced first into an antoclave made of glass. After heating to 80° C and evacuation of the air by means of ethylene 4 mMole of $Al(C_2H_5)_3$ and 2 ml (0.2 mMole Cr) of the abovementioned suspension were added. The polymerization was carried out at 85° C by introducing 40 g of ethylene/h and hydrogen at such a rate that the gaseous phase was to contain 25% by volume of hydrogen.

The polymerization was terminated after 6 hours at a pressure of 6.5 kg/cm². 240 g of polyethylene having a RSV value of 2.8 dl/g were obtained after filtration.

The result per mMole of chromium was 1.2 kg of polyethylene obtained.

COMPARATIVE EXAMPLE C

Preparation of component A of $Ti(OiC_3H_7)_4$ and of $CrCl_3.6\ H_2O$.

32.7 g (0.15 mole) of $Ti(OiC_3H_7)_4$ and 26.6 g (0.1 mole) of $CrCl_3.H_2O$ were reacted as per the description given by example 11 and worked up.

10 ml (1.0 mMole Cr) of the abovementioned suspension were introduced into an autoclave made of glass — according to the description given by example 11 — for polymerization. The pressure increased immediately to 7.5 kg/cm² and 16 g of polyethylene were obtained after 5 hours.

The result per mMole of chromium was 16 g of polyethylene obtained.

COMPARATIVE EXAMPLE D

Preparation of component A without $CrCl_3.6\ H_2O$.

32.7 g (0.15 mole) of $Ti(OiC_3H_7)_4$ and 45.6 g (0.4 mole) of $Mg(OC_2H_5)_2$ were stirred in 200 ml of Diesel oil at 70° C for 10 hours, then for a further hour at 140° C. The suspension was augmented so as to reach 1 liter.

The polymerization was carried out according to example 2 while using 5 ml (0.75 mMole Ti) of suspension and 4 mMole of $Al(C_2H_5)_3$. After a short while the pressure in the autoclave increased to 7 kg/cm². 13 g of polyethylene were obtained after 5 hours. The result per mMole of Ti was 17 g of polyethylene obtained.

EXAMPLE 12

10.4 g (0.05 mole) of $Si(OC_2H_5)_4$ were added to a suspension of 57.0 g (0.5 mole) of $Mg(OC_2H_5)_2$ in 250 ml of Diesel oil and heated to 80° C for 2 hours. The suspension was then blended with 26.6 g (0.1 mole) of $CrCl_3.6\ H_2O$ and stirred at 85° C for 10 hours. After eliminating the alcohol at 80° C in vacuo, the suspension was augmented with Diesel oil to reach 1 liter.

The polymerization was carried out according to example 10 while using 4 mMole of $Al(C_2H_5)_2Cl$ and 1 ml (0.1 mMole Cr) of the abovementioned suspension. The portion of hydrogen contained in the gaseous phase was 35% by volume. 128 g of polyethylene having a RSV value of 2.4 dl/g were obtained.

The result per mMole of chromium was 1.28 kg of polyethylene obtained.

EXAMPLE 13

The test was carried out according to example 11 while using 4 mMole of $Al(C_2H_5)_2Cl$ and 1 ml (0.1 mMole Cr) of the suspension prepared according to example 12. The polymerization was performed at 80° C by introducing 30 g of ethylene, 1.25 g of butene-(1) and hydrogen at such a rate that its portion contained in the gaseous phase was to be 20% by volume. The pressure increased to 6.6 kg/cm² during the polymerization. The product was filtered from the dispersing agent, then dried.

152 g of ethylene-butene-(1) copolymerization product having a RSV value of 2.8 dl/g and a density of 0.938 g/cm³ were obtained.

EXAMPLE 14

15.3 g (0.15 mole) of $Al(OiC_3H_7)_3$ were added to a suspension of 45.6 g (0.4 mole) of $Mg(OC_2H_5)_2$ in 250 ml of $CCl_4$ and boiled under reflux for 3 hours. Subsequently, the suspension was blended with 23 g (0.1 mole) of $Cr[Cl_2(OH)_2)_4]Cl$ and stirred under reflux for 10 hours. 500 ml of Diesel oil were added dropwise to the solution and $CCl_4$ as well as the alcohol formed during the reaction simultaneously driven off by distillation. The temperature was maintained at 140° for further 2 hours.

The suspension was augmented with Diesel oil to 1 liter.

Polymerization was carried out according to example 2 while using 2 ml (0.2 mMole Cr) of the abovementioned suspension and 4 mMole of $(C_2H_5)_3Al_2Cl_3$. Polymerization was carried out at 85° by introduction of 30 g of ethylene/h and hydrogen at such a rate that the hydrogen portion contained in the gaseous phase was 30% by volume.

The polymerization was terminated at a pressure of 6.5 kg/cm² after 6 hours.

180 g of polyethylene having a RSV value of 2.9 dl/g were obtained after filtration.

EXAMPLE 15

50 ml of the suspension of catalyst component A (corresponding to 5 mMole Cr) which had been prepared according to example 14, were purified of Diesel oil in a 100 ml flask by washing with hexane, they were then pre-activated in 50 ml of hexane with 15 mMole of $Al(C_2H_5)_2Cl$ at 50° C.

2 ml (0.2 mMole Cr) of suspension of the pre-activated catalyst component A were stirred thoroughly under nitrogen with 50 g of polyethylene (RSV value = 2.0 dl/g) in a 1 liter laboratory autoclave equipped with a stirring device scraping along the wall, then the hexane was evacuated from the autoclave by flushing with nitrogen. Polymerization was then carried out after addition of 4 mMole of $Al(C_2H_5)_2Cl$ at temperatures of from 95° to 100° C by introducing 30 g of ethylene/h. The portion of hydrogen for controlling the molecular weight was 25% by volume.

176 g of polyethylene having a RSV value of 2.8 dl/g were obtained after 6 hours. The pressure in the autoclave increased to 6.4 kg/cm$^2$.

830 g of polyethylene were obtained per mMole of chromium.

EXAMPLE 16

20.8 g (0.1 mole) of $Si(OC_2H_5)_4$ were added to a suspension of 45.6 g (0.4 mole) of $Mg(OC_2H_5)_2$ in 200 ml of xylene and reacted with 23 g (0.1 mole) of $Cr[Cl_2(H_2O)_4]Cl$ at 85° C. After elimination of the alcohol which had been formed during the reaction the temperature was maintained at 140° C for 2 hours. The volume of the suspension was increased to 1 liter with Diesel oil.

Polymerization was carried out according to example 11 while using 1.5 ml (0.15 mMole Cr) of the abovementioned suspension, 4 mMole of $Al(C_2H_5)_3$ and 4 ml of $CHCl_3$. Operational temperature was 85° C for introducing 40 g of ethylene/h and hydrogen at such a rate that its portion contained in the gaseous phase was 35% by volume. The polymerization was terminated after 5 hours at a pressure of 6.3 kg/cm$^2$.

198 g of polyethylene having a RSV value of 2.6 dl/g were obtained after filtration.

The result per mMole of chromium was 1.32 kg of polyethylene obtained.

EXAMPLE 17

500 ml of Diesel oil (boiling range from 140° to 200° C) were introduced first into a 1 liter autoclave and heated to 125° C. The air was evacuated by means of hydrogen and 10 ml (1.0 mMole Cr) of the suspension prepared according to example 16 as well as 2 mMole of $Al(C_2H_5)_2Cl$ added. The polymerization was carried out at a temperature from 130° to 140° C after introduction of 50 g of ethylene/h. The partial pressure of hydrogen for controlling the molecular weight was 65% by volume. The polymerization was terminated after about 4 hours and a pressure increase in the reactor to 6.8 kg/cm$^2$.

30 ml of i-propanol were added to the hot polymer solution and stirring continued for further 30 minutes. After cooling the product it was filtered and dried at 70° C in vacuo.

148 g of polyethylene having a RSV value of 0.51 dl/g were obtained.

EXAMPLE 18

26.6 g (0.1 mole) of $CrCl_3.6\ H_2O$ were added to a suspension of 68.4 g (0.6 mole) of $Mg(OC_2H_5)_2$ in 300 ml of chloroform and stirred under reflux for 8 hours. After addition of 200 ml of $HCCl_3$ to the solution 300 g of aluminum oxide were further added while stirring. 500 ml of Diesel oil were then added dropwise while stirring and eliminating $HCCl_3$ by distillation.

The suspension was then maintained at a temperature of 140° C for 30 minutes. The volume of the suspension was then increased to 1 liter with Diesel oil.

500 ml of Diesel oil were introduced first into a 1 liter autoclave made of glass. After heating to 80° C and evacuation of the air by means of ethylene, 4 mMole of $Al(C_2H_5)_2Cl$ and 2 ml (0.2 mMole of chromium) of the suspension were added. The polymerization was carried out at 85° C by introducing under a pressure of 2 kg/cm$^2$ hydrogen and then ethylene up to a total pressure of 6 kg/cm$^2$. The total pressure of 6 kg/cm$^2$ was maintained by continuing to introduce ethylene under pressure. The polymerization was terminated after 2 hours.

184 g of polyethylene having a RSV value of 2.6 dl/g were after filtration. The result obtained per mMole of chromium was 920 g of polyethylene obtained.

EXAMPLE 19

23.0 g (0.1 mole) of $[CrCl_2(OH_2)_4]Cl$ were added to a suspension of 49.3 g (0.44 mole) of $Mg(OC_2H_5)_2$ in 300 ml of $CCl_4$ and stirred under reflux for 12 hours. Further 300 ml of $CCl_4$ were added to the solution, then 200 g of silica gel and 100 g of magnesium oxide added while stirring. $CCl_4$ was eliminated by distillation while adding Diesel oil. The temperature of the suspension was maintained at 140° C for 30 minutes. The volume of the suspension was then increased with Diesel oil to reach 1 liter.

The test was carried out according to example 18 while using 4 mMole of $AlCl(C_2H_5)_2$ and 2 ml (0.2 mMole of chromium) of the abovementioned suspension. The gaseous phase contains 35% by volume of hydrogen. 178 g of polyethylene having a RSV value of 2.4 dl/g were. The result obtained per mMole of chromium was 890 g of polyethylene obtained.

EXAMPLE 20

26.6 g (0.1 mole) of $CrCl_3.6\ H_2O$ were added to a suspension of 68.4 g (0.6 mole) of $Mg(OC_2H_5)_2$ in 500 ml of ethanol and stirred under reflux for 12 hours. After addition of 300 g of magnesium hydroxide, ethanol is eliminated by distillation, while adding dropwise 500 ml of Diesel oil. Subsequently the suspension was stirred at 140° C for 2 hours and after cooling its volume increased with Diesel oil to reach 1 liter.

500 ml of Diesel oil and 0.4 ml of $CHCl_3$ were first introduced into an autoclave made of glass. After heating to 80° C and evacuation of the air by means of ethylene 3 mMole of $Al(C_2H_5)_3$ and 1 ml (0.15 mole of chromium) of the abovementioned suspension were added.

Polymerization was carried out at 85° C by introducing 40 g of ethylene/h and hydrogen at such a rate that the gaseous phase contains 25% by volume of hydrogen.

The polymerization was terminated at a pressure of 6.5 kg/cm$^2$ after 4 hours.

163 g of polyethylene having a RSV value of 2.6 dl/g were obtained after filtration.

The result per mMole of chromium was 1.08 kg of polyethylene obtained.

EXAMPLE 21

50 ml of the suspension of catalyst component A (5 mMole of chromium) prepared according to example 20 were purified of Diesel oil by washing with hexane in a 100 ml flask, then blended at 50° C while stirring in 50 ml of hexane with 15 mMole of $Al(C_2H_5)_2Cl$.

2 ml of suspension (0.2 mMole Cr) of the pre-activated catalyst component A were stirred thoroughly under nitrogen with 50 g of polyethylene (RSV = 2.0 dl/g) in a 1 liter laboratory autoclave equipped with a stirring device scraping along the wall. Subsequently the hexane in evacuated from the autoclave by flushing with nitrogen. After addition of 4 mMole of $Al(C_2H_5)_2Cl$ the polymerization is initiated at a temperature of from 95° – 100° C by introducing 30 g of ethylene/h. The hydrogen portion for controlling the molecular weight was 25% by volume.

After a polymerization period of 6 hours the result was 166 g of polyethylene having a RSV value of 2.9 dl/g. The final pressure in the autoclave was 6.4 kg/cm².

830 g of polyethylene were obtained per mMole of chromium.

EXAMPLE 22

20.4 g (0.1 mole of $Al(OiC_3H_7)_3$ were added to a suspension of 45.6 g (0.4 mole) of $Mg(OC_2H_5)_2$ in 300 ml of chloroform and boiled under reflux for 3 hours. A suspension is then blended with 26.6 g (0.1 mole) of $CrCl_3.6\ H_2O$ and stirred under reflux for 10 hours. The solution was diluted with 200 ml of chloroform, subsequently 250 g of silica gel and 50 g of aluminum oxide were introduced while stirring. 500 ml of Diesel oil were added dropwise while stirring with elimination of $HCCl_3$ by distillation. The suspension was stirred at 140° C for another hour. The volume of the suspension was finally increased with Diesel oil to 1 liter.

500 ml of Diesel oil were introduced first into an autoclave made of glass. After heating to 80° C and evacuation of the air by means of ethylene 4 mMole $Al(C_2H_5)_3$ and 2 ml (0.2 mMole of chromium) of the abovementioned suspension were added. The polymerization was carried out at 85° C by introduction of 35 g of ethylene/h and hydrogen at such a rate that the gaseous phase contained 25% by volume of hydrogen.

The polymerization was terminated after 6 hours at a pressure of 6.5 kg/cm² and 210 g of polyethylene having a RSV value of 2.8 dl/g were obtained after filtration.

The result per mMole of chromium was 1.05 kg of polyethylene obtained.

EXAMPLE 23

21.8 g (0.1 mole) of $Ti(OiC_3H_7)_4$ were added dropwise to a suspension of 45.6 g (0.4 mole) of $Mg(OC_2H_5)_2$ in 200 ml of carbon tetrachloride and stirred under reflux for 6 hours. 26.6 g (0.1 mole) of $CrCl_3.6\ H_2O$ were then added and the reaction mixture maintained under reflux for 8 hours. The solution was diluted with 300 ml of $CCl_4$, subsequently 150 g of silica gel and 150 g of aluminum oxide were introduced into the solution while stirring. Furthermore, 500 ml of Diesel oil were added dropwise and $CCl_4$ eliminated by distillation while stirring. Agitation was continued at 140° C for another 30 minutes.

The volume of the suspension was increased with Diesel oil to reach 1 liter.

The polymerization was carried out according to example 22 while using 3 ml (0.3 mMole of chromium) of the abovementioned suspension and 4 mMole of $Al_2(C_2H_5)_3Cl_3$.30 g of ethylene/h and hydrogen were introduced at such a rate that the hydrogen portion contained in the gaseous phase was 30% by volume at 85° C.

The polymerization was terminated at a pressure of 6.5 kg/cm² after 6 hours.

175 g of polyethylene having a RSV value of 2.9 dl/g were obtained after having filtered off the dispersing agent.

EXAMPLE 24

34.2 g (0.3 mole) of $Mg(OC_2H_5)_2$ were added to a suspension of 21.2 g (0.1 mole) of $[CrCl_3OH_2)_3]$ in 300 ml of chloroform and stirred under reflux for 8 hours. 200 ml of chloroform were added to the solution and then 200 g of aluminum oxide, 50 g of magnesium oxide and 50 g of silica gel introduced into the solution while stirring. Chloroform was eliminated by distillation during simultaneous dropwise addition of Diesel oil and the volume of the suspension was increased with Diesel oil to reach 1 liter.

The polymerization was carried out according to example 22 while using 1.5 ml (0.2 mMole of chromium) of the abovementioned suspension 4 mMole of $Al(C_4H_9)_3$ and 4 ml of $HCCl_3$. 30 g of ethylene/h and hydrogen were introduced at such a rate that the hydrogen portion contained in the gaseous phase was 35% by volume at 85° C. The polymerization was terminated at a pressure of 6.3 kg/cm² after 5 hours. 148 g of polyethylene having a RSV value of 2.45 dl/g were obtained after filtration.

EXAMPLE 25

26.6 g (0.1 mole) of $CrCl_3.6\ H_2O$ were added to a suspension of 68.4 g (0.6 mole) of $Mg(OC_2H_5)_2$ in 250 ml of $HCCl_3$ and stirred under reflux for 10 hours. 250 ml of $HCCl_3$ were added to the solution, then introduced while stirring 200 g of silica gel, 50 g of aluminum oxide and 25 g of $Mg(OH)_2.HCCl_3$ was withdrawn by means of a rotation evaporator and the solid residue heated to 400° C for 5 hours. The solid substance was cooled in a nitrogen ($N_2$) atmosphere and then suspended in 500 ml of Diesel oil; the volume of the suspension was increased to 1 liter.

Ethylene was polymerized according to example 18 while using 4 mMole of aluminum isooctyl and 10 ml (1.0 mMole of Cr) of the abovementioned suspension. The gaseous phase contains 25% by volume of hydrogen. 166 g of polyethylene having a RSV value of 4.6 dl/g were obtained.

EXAMPLE 26

Ethylene and butene-1 were polymerized under the conditions stated for example 22 while using 1 mMole of $Al(C_2H_5)_3$ and 2 ml (0.2 mMole of chromium) of the suspension of the catalyst component A prepared according to example 1. The polymerization was carried out at 85° C by introducing 40 g of ethylene and 1.2 g of butene-1 p/hour and hydrogen at such a rate that the gaseous phase contained 20% by volume of hydrogen.

The pressure increased to about 6.5 kg/cm² during the polymerization (5 hours). After isolation of the dispersing agent the product was dried.

188 g of ethylene-butene-copolymer having a RSV value of 2.8 dl/g and a density of 0.936 g/cm³ were obtained.

EXAMPLE 27

500 ml of Diesel oil (boiling range from 140° – 200° C) were first introduced into a 1 liter autoclave and heated to 125° C. The air was evacuated by means of hydrogen. 10 ml (1.0 mMole of chromium) of the suspension of catalyst component A prepared according to example 1 and 2 mMole of $Al(C_2H_5)_2Cl$ were added. The polymerization was carried out at a temperature of from 130° – 140° C after having introduced 45 g of ethylene/hour. The hydrogen portion for controlling the molecular weight was 65%. The polymerization was terminated at a pressure in the reactor of 6.8 kg/cm², after 4 hours.

30 ml of propanol were added to the hot polymer solution and stirring continued for 30 minutes. 163 g of polyethylene having a RSV value of 0.5 dl/g were obtained after filtration.

What is claimed is:

1. A process for preparing a mixed catalyst by reaction of a transition metal compound with a metal alcoholate to produce a reaction product A and mixing the reaction product A with an activator B, wherein the activator is of the formula $Me^4R'_qX_{p-q}$ wherein $Me^4$ represents a metal of the $I^{st}$, $II^{nd}$, $III^{rd}$, or $IV^{th}$ main group or of the $II^{nd}$ subgroup of the periodic system, R' represents a hydrocarbon radical having from 1 to 16 carbon atoms, X represents hydrogen, a halogen atom or alkoxy or dialkylamine radicals having from 1 to 8 carbon atoms, p represents the valency of $Me^4$ and q represents an integer corresponding to $1 \leq q \leq p$, comprising the steps of preparing A by reacting chromium-III halide of the formula $CrX'_3.nH_2O$, wherein X' is Cl or Br and n is from 1 to 10, with a metal alcoholate, in a molar ratio of chromium to metal of said metal alcoholate of 1 : 1 to 1 : 10 to form a chromium complex, and wherein the metal alcoholate has the formula $$[Me^1_x(OR)_v]Me^2_yMe^3_zH_w$$

in which $Me^1$, $Me^2$, $Me^3$ each means a metal of the $I^{st}$, $II^{nd}$, $III^{rd}$, or $IV^{th}$ main group or of the $I^{st}$, $II^{nd}$, $IV^{th}$, and $V^{th}$ subgroup of the periodic system of elements, or iron, cobalt, or nickel, R means a hydrocarbon radical having from 1 to 20 carbon atoms, x means an integer from 1 to 5, y means an integer from 0 to 2, z means an integer from 0 to 2, v means an integer from 2 to 8 and w means either 0 or 1, with the proviso that (valency $Me^1$).$x$ + (valency $Me^2$).$y$ + (valency $Me^3$).$z$ + $w$ = $v$.

2. The process as defined in claim 1, wherein the chromium compound is reacted with said metal alcoholate in at least one of $CCl_4$, $CHCl_3$, $CH_2Cl_2$, aromatic hydrocarbon, hydrogenated Diesel oil, aliphatic or cycloaliphatic hydrocarbons, alcohols, or mixtures or hydrocarbons and alcohols.

3. The process as defined in claim 1, wherein the chromium-III compound is a chlorine.

4. The process defined in claim 1, wherein the chromium complex formed from said chromium-III compound and the metal alcoholate is deposited onto a carrier material, using per 1 mMole of chromium from 0.5 to 5 g of carrier material.

5. The process according to claim 4, wherein said carrier material used has a specific surface from 200 to 500 m²/g.

6. The process as defined in claim 1, wherein a mixture of a complex metal alcoholate with a simple metal alcoholate is used to produce reaction product A.

7. The process as defined in claim 1, wherein as a metal alcoholate a mixture is used consisting of a metal alcoholate having the formula $$[Me^1_x(OR)_v]Me^2_yMe^3_zH_w$$

wherein $Me^1$, $Me^2$, and $Me^3$ each means a metal of the Ist, IInd, IIIrd or IVth main group or of the Ist, IInd, IVth and Vth subgroup of the periodic system of elements, or iron, cobalt or nickel, R means a hydrocarbon radical having from 1 to 20 carbon atoms, x means an integer from 1 to 5, y means an integer from zero to 2, z means an integer from zero to 2, v means an integer from 2 to 8 and w means either zero or 1, in admixture with a metal alcoholate having the formula $$[Me^1_{x'}(OR)_{v'}]Me^2_{y'}Me^3_{z'}H_{w'}$$

wherein $Me^1$, $Me^2$, and $Me^3$ each is as defined above, R is as defined above, $x'$ is an integer from 1 to 5, $y'$ is zero, $z'$ is zero, $v'$ is an integer from 2 to 8 and $w'$ is zero.

8. A mixed catalyst as a reaction product of (1) a chromium-III compound of the formula $CrX'_3.nH_2O$ wherein X' is Cl or Br, n is 1 to 10, $[Cr(H_2O)_6](CH_3CO_2)_3$ and $[Cr(H_2O)_6](HCO_2)_3$, and (2) a metal alcoholate in admixture with an organo metallic compound as an activator therefor of the formula $Me^{4+}R'qXp-q$ wherein $Me^4$ represents a metal of the $I^{st}$, $II^{nd}$, $III^{rd}$, or $IV^{th}$ main group or of the $II^{nd}$ subgroup of the periodic system, R' represents a hydrocarbon radical having from 1 to 16 carbon atoms, X represents hydrogen, a halogen atom or alkoxy or dialkylamine radicals having from 1 to 8 carbon atoms, p represents the valency of $Me^4$ and q represents an integer corresponding to $1 \leq q \leq p$, and wherein said metal alcoholate is of the formula $$[Me^1_x(OR)_v]Me^2_yMe^3_zH_w$$

wherein $Me^1$, $Me^2$, $Me^3$ each means a metal of the $I^{st}$, $II^{nd}$, $III^{rd}$ or $IV^{th}$ main group or of the $I^{st}$, $II^{nd}$, $IV^{th}$ and $V^{th}$ subgroup of the periodic system of elements, or iron, cobalt, or nickel, R is a hydrocarbon radical having from 1 to 20 carbon atoms, x is an integer from 1 to 5, y is an integer from zero to 2, z is an integer from zero to 2, v is an integer from 2 to 8 and w is either zero or 1, with the proviso that (valency $Me^1$).$x$ + (valency $Me^2$).$y$ + (valency $Me^3$).$z$ + $w$ = $v$ in a molar ratio of chromium to metal in said alcoholate being 1 : 1 to 1 : 10.

9. The mixed catalyst as defined in claim 8, comprising said chromium complex of chromium-III compound and the metal alcoholate, and a carrier material therewith, in an amount from 0.5 to 5 g of carrier material per 1 mMole of chromium.

10. In a method for polymerizing a 1-olefin, the improvement comprising catalyzing said polymerizing with a mixed catalyst defined in claim 8.

11. The process as defined in claim 10, comprising catalyzing said polymerization of a mixture of at least 70 weight percent of ethylene and a mixture of 30 weight percent of a different 1-olefin.

12. A process for the manufacture of a polyolefin by polymerization of at least one 1-olefin having formula R″—CH=CH$_2$, wherein R″ means hydrogen or a straight-chain or branched alkyl radical having from 1 to 10 carbon atoms, comprising catalyzing said polymerization in the presence of the mixed catalyst as defined in claim 8.

13. The process as defined in claim 12, comprising a polymerization of a mixture of at least 70 weight percent of ethylene and a maximum of 30 weight percent of a different 1-olefin.

* * * * *